US009622302B2

(12) United States Patent
Mishima et al.

(10) Patent No.: US 9,622,302 B2
(45) Date of Patent: Apr. 11, 2017

(54) LIGHTING SYSTEM

(71) Applicant: PANASONIC INTELLECTUAL PROPERTY MANAGEMENT CO., LTD., Osaka (JP)

(72) Inventors: Masanori Mishima, Kyoto (JP); Nobuyoshi Takeuchi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 32 days.

(21) Appl. No.: 14/819,688

(22) Filed: Aug. 6, 2015

(65) Prior Publication Data
US 2016/0050728 A1 Feb. 18, 2016

(30) Foreign Application Priority Data

Aug. 18, 2014 (JP) .................................. 2014-166101

(51) Int. Cl.
| | |
|---|---|
| *H05B 33/08* | (2006.01) |
| *F21V 23/02* | (2006.01) |
| *F21V 29/74* | (2015.01) |
| *F21V 23/00* | (2015.01) |

(52) U.S. Cl.
CPC ....... *H05B 33/0815* (2013.01); *F21V 23/003* (2013.01); *F21V 23/02* (2013.01); *F21V 29/74* (2015.01); *H05B 33/0851* (2013.01)

(58) Field of Classification Search
CPC .......... F21K 9/00; F21V 29/004; F21V 29/87; F21V 29/89; F21V 29/20; F21V 29/507; F21V 23/003; F21V 29/006; F21V 29/02; F21V 29/503; F21V 29/70; F21V 29/74; F21V 23/02; G02F 2001/133628;
(Continued)

(56) References Cited

U.S. PATENT DOCUMENTS

| | | | |
|---|---|---|---|
| 8,664,838 B2 * | 3/2014 | Yuan ........................ | F21K 9/00 313/46 |
| 8,845,137 B2 * | 9/2014 | Van De Ven ............. | F21K 9/00 362/249.01 |

(Continued)

FOREIGN PATENT DOCUMENTS

| | | |
|---|---|---|
| JP | 2004-319595 | 11/2004 |
| JP | 2010-080139 | 4/2010 |

(Continued)

*Primary Examiner* — Vibol Tan
(74) *Attorney, Agent, or Firm* — Greenblum & Bernstein, P.L.C.

(57) ABSTRACT

A lighting system includes: a lighting device having an LED as a light source; a lighting circuit; and a heat dissipation device configured to dissipate heat generated by the lighting device. The lighting circuit has: a power source configured to supply electric power to the LED; and a controller configured to control current which is output from the power source to the LED. The heat dissipation device has a device characteristics information providing unit configured to provide device characteristics information of the heat dissipation device to the controller, wherein the controller determines compatibility between the heat dissipation device and the lighting device, based on the device characteristics information, and controls lighting of the LED.

15 Claims, 9 Drawing Sheets

(58) Field of Classification Search
CPC ........... G09G 2320/041; G09G 3/3406; H05B 33/0815; H05B 37/02; H05B 33/0851
See application file for complete search history.

(56) References Cited

U.S. PATENT DOCUMENTS

| | | | |
|---|---|---|---|
| 2006/0192750 A1* | 8/2006 | Lai | G02F 1/133604 345/102 |
| 2011/0210675 A1 | 9/2011 | Hamamoto et al. | |
| 2013/0293877 A1* | 11/2013 | Ramer | H05B 33/0842 356/213 |
| 2014/0097753 A1* | 4/2014 | Hui | H05B 33/089 315/112 |
| 2015/0163868 A1* | 6/2015 | Houot | H05B 33/0884 315/113 |

FOREIGN PATENT DOCUMENTS

| | | |
|---|---|---|
| JP | 2011-014508 | 1/2011 |
| JP | 2011-181295 | 9/2011 |
| JP | 2011-258533 | 12/2011 |

* cited by examiner

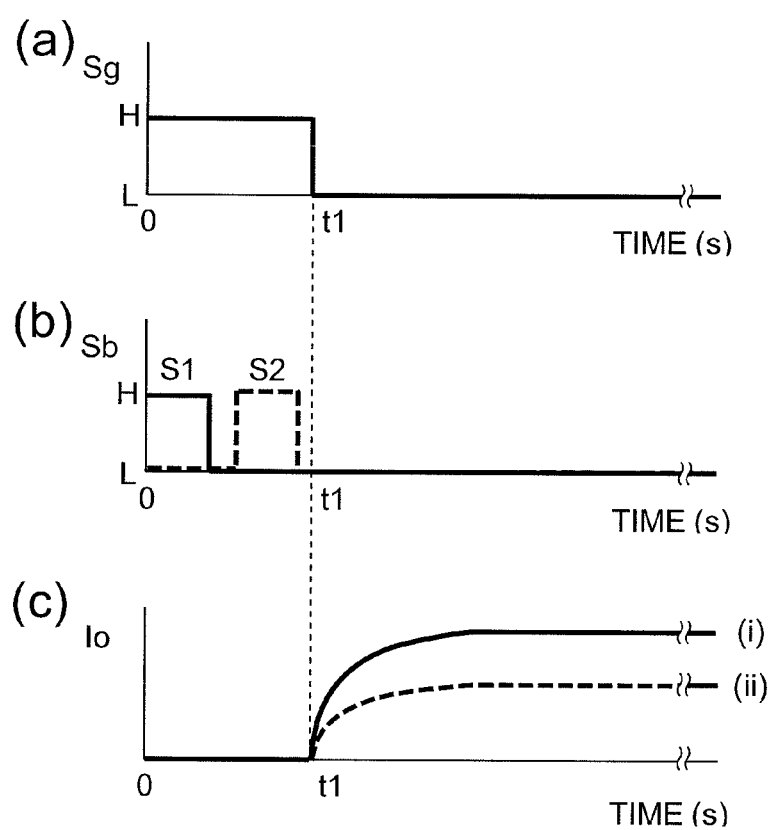

LIGHTING SYSTEM

BACKGROUND OF THE INVENTION

1. Field of the Invention

The present disclosure relates to a lighting system using a lighting device which has a light-emitting diode (LED) as a light source.

2. Description of the Related Art

The LED is widely used as a light source for various electric devices such as lighting devices because the LED emits high-brightness light with a low electric power. The LED used for lighting devices generates much heat when the LED emits high-brightness light, for example. Light emission characteristics of an LED are deteriorated when the LED is subjected to high temperature conditions, and the LED is damaged by heat in some cases.

To address this issue, a lighting device which has an LED as a light source is generally attached with a heat dissipation device having a heat dissipation property responsive to the light emission characteristics of the LED. However, if the heat dissipation device is deteriorated with time or does not have an appropriate thermal resistance value corresponding to the light emission characteristics of the LED, the heat generated by the LED is not properly dissipated, and the LED is damaged in some cases.

For example, Unexamined Japanese Patent Publication No. 2004-319595 discloses a lighting device in which temperature of a substrate on which an LED is mounted and temperature of a heatsink are detected to monitor secular change of the heat dissipation property, based on a thermal resistance value between the substrate and the heatsink. Unexamined Japanese Patent Publication No. 2011-181295 discloses a lighting device having a characteristics setting unit in which the characteristics of the LED are previously set.

SUMMARY OF THE INVENTION

A lighting system in the present disclosure includes: a lighting device which has an LED as a light source; a lighting circuit for causing the light source to emit light; and a heat dissipation device for dissipating heat generated by the lighting device. The lighting circuit has: a power source for supplying electric power to the light source; and a controller for controlling current which is output from the power source to the light source. The heat dissipation device has a device characteristics information providing unit for providing device characteristics information of the heat dissipation device to the controller. The controller determines compatibility between the heat dissipation device and the lighting device, based on the device characteristics information, and controls lighting of the light source, depending on the compatibility.

With the above configuration, the lighting device can adjust, on the lighting system, an output of the light source, based on the device characteristics information. Thus, the compatibility between the heat dissipation device and the lighting device is automatically determined upon the lighting device being attached to the heat dissipation device.

BRIEF DESCRIPTION OF DRAWINGS

FIG. 13 is time chart showing relationships, in the lighting system shown in FIG. 10, (a) between a control signal Sg and time, (b) between states of switches S1 and S2 and time, and (c) between a current value Io and time.

DETAILED DESCRIPTION OF THE PREFERRED EMBODIMENTS

Figure 1:
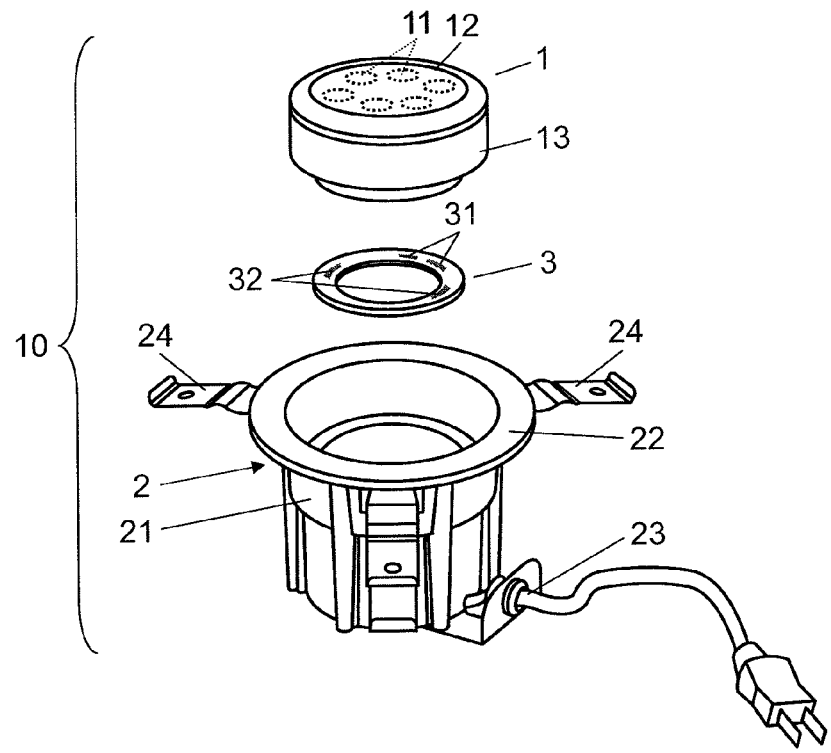
FIG. 1 is an exploded perspective view of a lighting system according to a first exemplary embodiment of the present disclosure.

Before exemplary embodiments are described, a lighting system of a related art will be described. In a lighting system described in Unexamined Japanese Patent Publication No. 2004-319595, temperature of a substrate and temperature of a heatsink are each measured. Thus, a sensor needs to be provided on each of the substrate and the heatsink. In addition, it is necessary to calculate a thermal resistance value from results of the measurements. Further, the lighting system described in Unexamined Japanese Patent Publication No. 2004-319595 does not include information about heat dissipation of an LED. Thus, heat cannot be sufficiently dissipated when an arbitrary lighting device and an arbitrary heat dissipation device are combined. Generally, at the time of attaching the lighting device to the heat dissipation device, it is difficult for a user to attach in consideration of compatibility between the lighting device and the heat dissipation device.

A lighting system according to an aspect of the present disclosure will be described with reference to the drawings. Note that any of the exemplary embodiments to be described below represents a preferred specific example.

Therefore, numerical values, shapes, materials, components, positions and connection forms of the components, steps, an order of the steps, and the like shown in the following exemplary embodiments are examples and do not limit the present disclosure.

Further, the drawings are schematic diagrams and not necessarily drawn exactly. In the drawings, substantially the same structure is assigned the same reference numeral, and is not described again or is briefly described.

First Exemplary Embodiment

Figure 2:
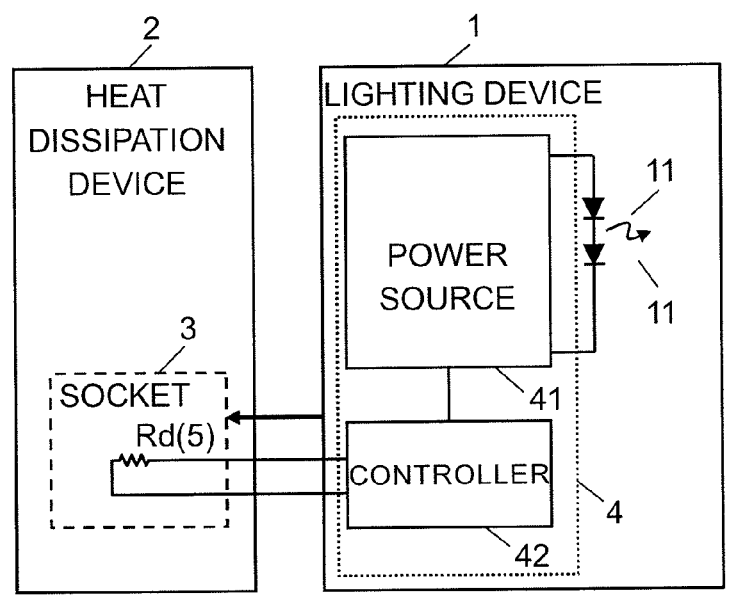
FIG. 2 is a block diagram of the lighting system shown in FIG. 1.
Figure 3:
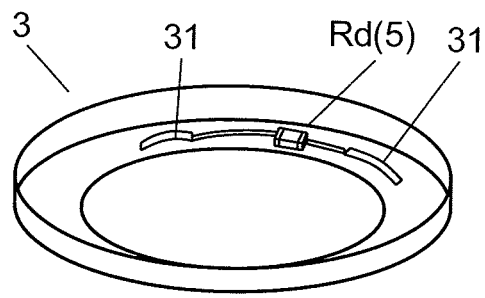
FIG. 3 is a perspective view showing a rear surface of a socket used in the lighting system shown in FIG. 1.
Figure 4:
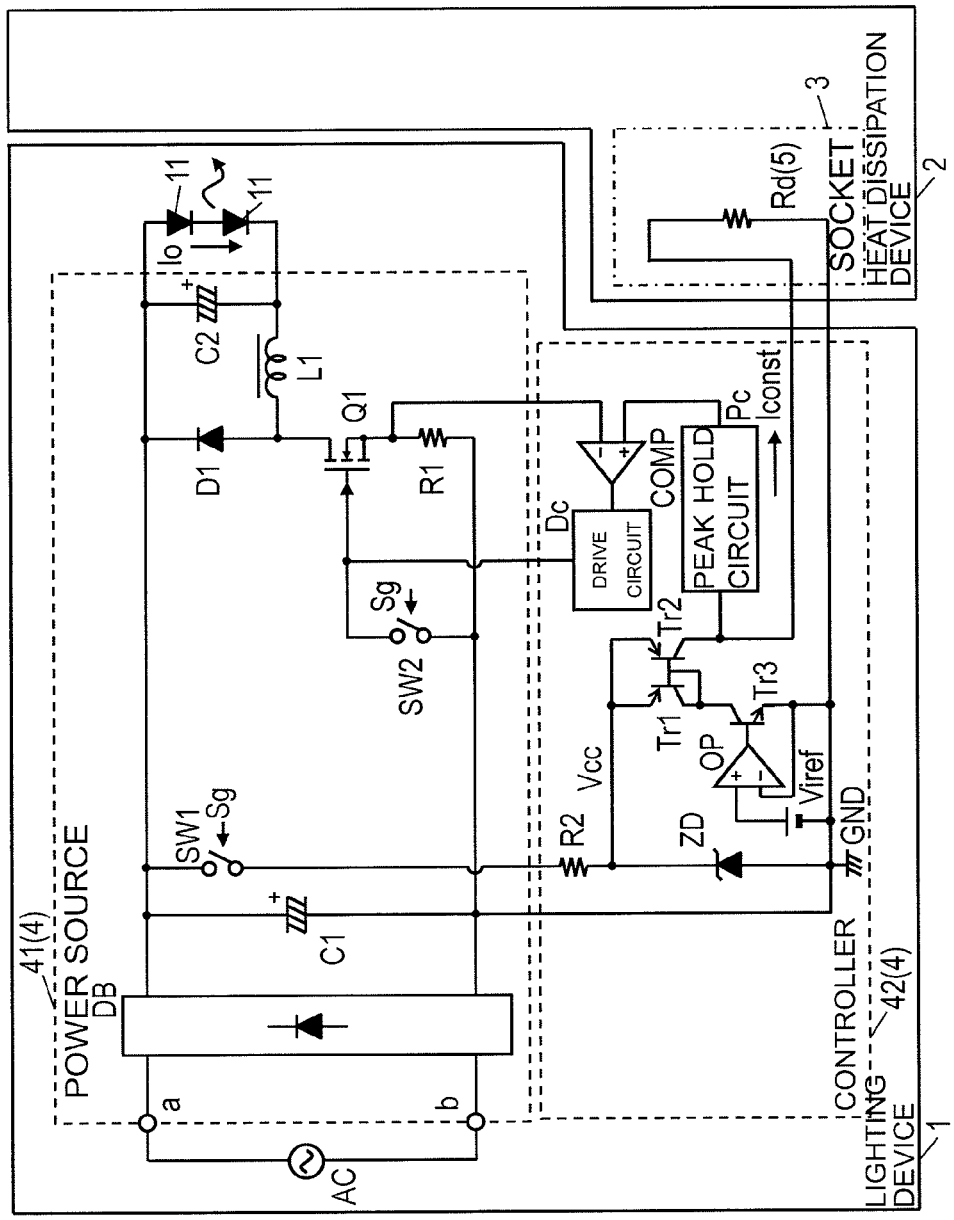
FIG. 4 is a circuit diagram of the lighting system shown in FIG. 1.
Figure 5A:
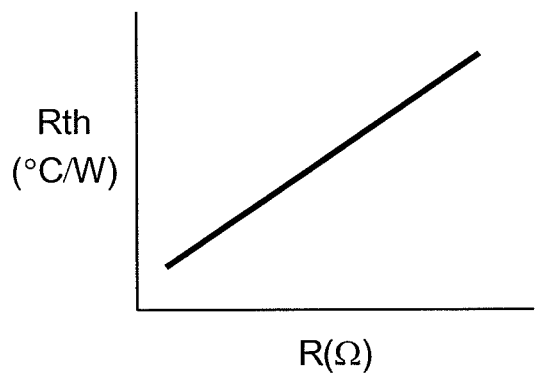
FIG. 5A is a diagram showing an example in which the relationship between a resistance value of a resistor used in the lighting system shown in FIG. 1 and a thermal resistance value is a proportional function.
Figure 5B:
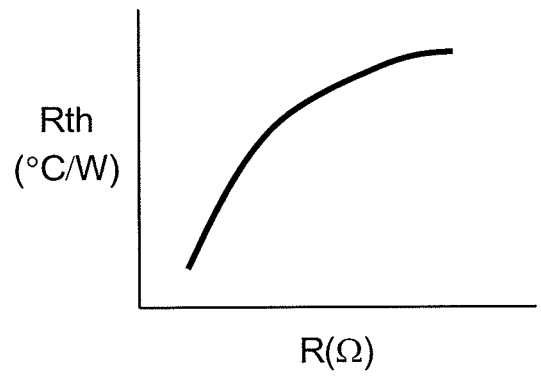
FIG. 5B is a diagram showing an example in which a relationship between the resistance value of the resistor used in the lighting system shown in FIG. 1 and the thermal resistance value is an upwardly-convex increasing function.
Figure 6:
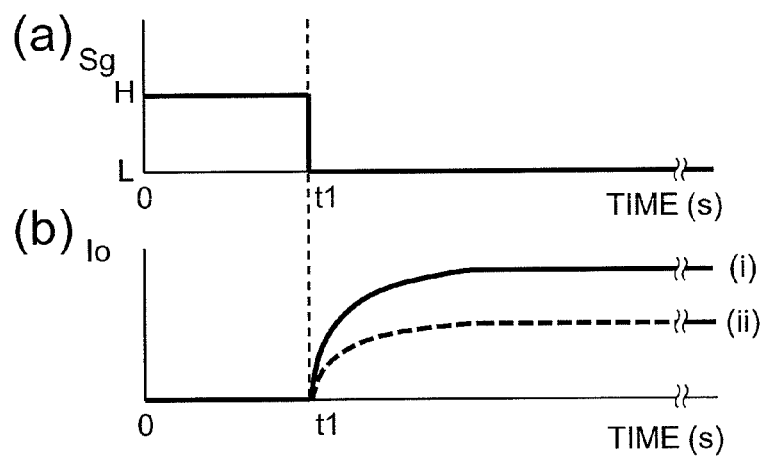
FIG. 6 is time chart showing relationships, in the lighting system shown in FIG. 1, (a) between a control signal Sg and time, and (b) between a current value Io and time.

Lighting system 10 according to a first exemplary embodiment of the present disclosure will be described with reference to the drawings. FIG. 1 is an exploded perspective view of lighting system 10. FIG. 2 is a block diagram of lighting system 10. FIG. 3 is a perspective view showing a rear surface of a socket used in lighting system 10. FIG. 4 is a circuit diagram of lighting system 10. FIG. 5A is a diagram showing an example in which the relationship between a resistance value of a resistor used in the lighting system shown in FIG. 1 and a thermal resistance value is a proportional function, and FIG. 5B is a diagram showing an example in which the relationship between the resistance value of the resistor used in the lighting system shown in FIG. 1 and the thermal resistance value is an upwardly-convex increasing function. FIG. 6 is time chart showing relationships, in lighting system 10, (a) between a control signal Sg and time, and (b) between a current value Io and time.

FIG. 1 shows, as an example of lighting system 10, a downlight to be embedded in a ceiling or the like. Lighting system 10 includes: lighting device 1 which has an LED, which is a solid light emitting element, as a light source; and heat dissipation device 2 for dissipating heat generated by lighting device 1. Further, in lighting system 10, heat dissipation device 2 has socket 3 with which lighting device 1 is attached to heat dissipation device 2.

Lighting device 1 has: an LED module (not shown) having a plurality of LEDs 11; optical member 12 for controlling distribution of light emitted from LEDs 11; and cylindrical housing 13 which houses the LED module and on which optical member 12 is mounted. Further, in lighting device 1, optical member 12 is disposed on one end of housing 13, and a plurality of connection pins (not shown) are disposed on the other end. The plurality of connection pins are electrically connected to each of socket 3 and heat dissipation device 2.

As LEDs 11 there are used LEDs which can emit illumination light having an intended light color in lighting system 10. For example, as LED 11 there is used a white LED configured with a GaN-based blue LED chip and a YAG-based yellow fluorescent substance. Other than a white LED, there can be used an appropriate combination of a plurality of LEDs such as red LEDs, green LEDs, and blue LEDs, which have different luminescent colors. As the light source there also can be used an OLED (Organic LED) using organic light emitting materials.

Heat dissipation device 2 has: a cylindrical main body 21 which holds and houses lighting device 1 and socket 3; edge part 22 configured to be fit in an opening formed on a ceiling or the like; and external connection part 23 to which a power line is connected to receive power supply from a commercial alternating power source AC (see FIG. 4). Whole of main body 21 functions as a heat dissipation member. Main body 21 is made of a material such as aluminum alloy or the like, which has a high heat dissipation property. On an outer circumference of main body 21, there are provided a plurality of fins (not shown) to improve the heat dissipation property with a larger surface area.

Lighting device 1 is, when housed in main body 21 of heat dissipation device 2, in contact with an inner side surface of main body 21 directly or through a heat dissipation sheet (not shown). The intermediary of the heat dissipation sheet improves the contact between lighting device 1 and the inner side surface of main body 21. Most part of the heat generated by LEDs 11 is dissipated from heat dissipation device 2 due to the contact between lighting device 1 and heat dissipation device 2. In addition, if a power capacity of power source 41 to be described later is large, heat dissipation device 2 can dissipate the heat generated by power source 41 in addition to the heat generated by LEDs 11. Further, heat dissipation device 2 has mounting spring 24 having a plate-like shape for fixing edge part 22 on a ceiling or the like.

Socket 3 is a circular member of a generally thin plate and has: pin receiving parts 31 in which a pair of connection pins of lighting device 1 are fit; and pin passing through holes 32 through which the other connection pins of lighting device 1 pass to the side of heat dissipation device 2.

As shown in FIG. 2, lighting device 1 has lighting circuit 4 for causing LEDs 11 to emit light. Lighting circuit 4 has: power source 41 for supplying electric power to LEDs 11, which are the light source; and controller 42 for controlling current which is output from power source 41 to LEDs 11. Specific configurations of power source 41 and controller 42 will be described later. Lighting device 1 has: at least a pair of connection pins (not shown) through which lighting device 1 is connected to external connection part 23 of heat dissipation device 2; and a pair of connection pins (not shown) through which lighting device 1 is connected to a circuit board of socket 3. Lighting system 10 has a configuration in which lighting circuit 4 is embedded in lighting device 1; however, lighting circuit 4 may be configured as a separate body from lighting device 1 as shown in an exemplary embodiment to be described later.

In lighting system 10, socket 3 has device characteristics information providing unit 5 for providing device characteristics information of heat dissipation device 2 to controller 42. Device characteristics information providing unit 5 is resistor Rd. A resistance value of resistor Rd corresponds to the device characteristics information. As shown in FIG. 3, a chip resistor is disposed, as resistor Rd, on a rear surface of socket 3. The resistance value of resistor Rd is a numerical value corresponding to thermal resistance of heat dissipation device 2 to which socket 3 is attached. It will be described later how to determine the resistance value. Resistor Rd is connected to wiring lines led from pin receiving parts 31. Controller 42 determines compatibility between heat dissipation device 2 and lighting device 1, based on the device characteristics information, and controls the lighting of LEDs 11, depending on the compatibility.

In lighting system 10, device characteristics information providing unit 5 is a chip resistor which can be electrically connected to controller 42 during operation. By changing resistor Rd, various characteristics information of heat dissipation device 2 can be dealt with. Further, resistor Rd is disposed on the rear surface of socket 3, and resistor Rd cannot be seen from a front surface of socket 3. Even when lighting device 1 is not attached to heat dissipation device 2, resistor Rd, which is an electronic component, is not exposed to outside. Therefore, users do not have an uncomfortable feeling about the design. In lighting system 10, an example is shown in which resistor Rd corresponds to the thermal resistance value; however, resistor Rd may correspond to a maximum temperature value allowed in heat dissipation device 2 or other values, for example.

As shown in FIG. 4, power source 41 has: input terminals a and b to be connected to commercial alternating power source AC; diode bridge DB for rectifying commercial alternating power source AC; and electrolytic capacitor C1 for smoothing connected to output terminals of diode bridge DB. In addition, power source 41 has: a series circuit connected between both ends of electrolytic capacitor C1, in which series circuit (i) diode D1, (ii) switching element Q1, and (iii) resistor R1 are series connected; and a series circuit connected between both ends of diode D1, in which series circuit (i) a parallel circuit made up of electrolytic capacitor C2 and LEDs 11 and (ii) inductor L1 are series connected. In addition, power source 41 has: first switch SW1 one end of which is connected to a positive output of diode bridge DB; and second switch SW2 connected between a gate of switching element Q1 and a ground.

Controller 42 has: a series circuit of resistor R2 and zener diode ZD which is disposed between the other end of first switch SW1 and the ground; and a series circuit of transistor Tr1 and transistor Tr3 which is connected between both ends of zener diode ZD. In addition, controller 42 has: an output terminal of operational amplifier OP connected to a base terminal of transistor Tr3; a negative input terminal of operational amplifier OP connected to an emitter terminal of transistor Tr3; and reference voltage source Viref connected to a positive input terminal of operational amplifier OP. Further, controller 42 has transistor Tr2 whose emitter terminal and base terminal are respectively connected to the emitter terminal and the base terminal of transistor Tr1, and the mutually connected base terminals of transistors Tr1 and Tr2 are connected to a collector terminal of transistor Tr1. In addition, controller 42 has: peak hold circuit Pc connected to a collector terminal of transistor Tr2; and comparator COMP whose positive input terminal is connected to an output of peak hold circuit Pc. The other negative input terminal of comparator COMP is connected to an intermediate point between switching element Q1 and resistor R1. Further, controller 42 has drive circuit Dc to which an output terminal of comparator COMP is connected, and the output terminal of comparator COMP is connected to the gate terminal of switching element Q1 through drive circuit Dc.

In addition, resistor Rd (device characteristics information providing unit 5) being provided on socket 3 and having the characteristics information of heat dissipation device 2 is connected between the collector terminal of transistor Tr2 and ground GND of the circuit.

Next, an operation of the circuit shown in FIG. 4 will be described. First, when power source 41 is connected to commercial alternating power source AC, first switch SW1 and second switch SW2 are both kept in an on-state. In controller 42, turning on of first switch SW1 allows current to flow through a path of first switch SW1-resistor R2-zener diode ZD. A constant voltage Vcc is generated on terminals of zener diode ZD. A constant current circuit is constituted by transistors Tr1, Tr2, and Tr3, operational amplifier OP, and reference voltage source Viref. A constant current Iconst flowing from the collector terminal of transistor Tr2 to resistor Rd maintains a voltage corresponding to the constant current Iconst at a terminal of resistor Rd which is connected to the peak hold circuit. Thus, a reference voltage is applied from peak hold circuit Pc to the positive terminal of comparator COMP. Further, second switch SW2, when turned on, connects the gate part of switching element Q1 to ground GND of the circuit, whereby switching element Q1 is turned off, thereby keeping LEDs 11 in an off-state.

Next, first switch SW1 and second switch SW2 both will be turned off. Tuning off of first switch SW1 disables charging through the path of commercial alternating power source AC-diode bridge DB-first switch SW1-resistor R2-zener diode ZD-diode bridge DB-commercial alternating power source AC. This operation makes a control power source voltage Vcc generated in controller 42 be 0 (V), whereby unnecessary power loss can be reduced. Turning off of second switch SW2 makes a gate signal of switching element Q1 equal to a drive circuit output of controller 42. Thus, with an arrangement in which the current flowing through switching element Q1 is detected by resistor R1 and is input, as a voltage, to the negative terminal of comparator COMP, a feedback control is performed so that the drive circuit output is equal to a value of the output (the reference voltage) of peak hold circuit Pc.

As described above, the resistance value of resistor Rd (device characteristics information providing unit 5) provided on socket 3 of heat dissipation device 2 is used as the device characteristics information, and the current value flowing through LEDs 11 is determined, based on the device characteristics information.

In power source 41, when switching element Q1 is in an on-state, current flows through a path of commercial alternating power source AC-diode bridge DB-electrolytic capacitor C2-inductor L1-switching element Q1-resistor R1-diode bridge DB-commercial alternating power source AC, whereby electrolytic capacitor C2 is charged. When switching element Q1 is in an off-state, energy accumulated in inductor L1 is discharged through a pass of inductor L1-diode D1-electrolytic capacitor C2-inductor L1. At this time, an approximately constant voltage is generated between both ends of electrolytic capacitor C2, whereby current flows through electrolytic capacitor C2-LEDs 11-electrolytic capacitor C2 to keep LEDs 11 lighting.

With reference to FIG. 5A and FIG. 5B, an example of the relationship between resistor Rd and thermal resistance value Rth will be described. When thermal resistance value Rth, which is the device characteristics information, of heat dissipation device 2 is made to have a proportional relationship with resistance value R of resistor Rd, it is easy to convert resistor Rd to thermal resistance value Rth. For example, FIG. 5A shows an example in which the relationship between resistance value R of resistor Rd and thermal resistance value Rth is a proportional function. In this case, with respect the resistance value of resistor Rd embedded in socket 3, when the thermal resistance value of heat dissipation device 2 is doubled, the resistance value of resistor Rd is doubled. This configuration can reduce, when resistor Rd is mounted on socket 3, judgment errors, such as mounting a wrong component (resistor chip), involved in manufacturing.

FIG. 5B shows an example in which the relationship between resistance value R of resistor Rd and thermal resistance value Rth is an upwardly-convex increasing function. The resistance value of resistor Rd can be set in a wider range in the example shown in FIG. 5B than in the example shown in FIG. 5A. In the case of the proportional function shown in FIG. 5A, when a minimum value and a maximum value of the resistance value of resistor Rd are once determined, the thermal resistance value is evenly divided between the minimum and maximum values. Thus, the ratio of the maximum value to the minimum value of the thermal resistance value can be set in a range of approximately 10 to 100. On the other hand, in the case of the upwardly-convex increasing function shown in FIG. 5B, the ratio of the maximum value to the minimum value of the thermal resistance value can be set by the exponent. Thus, the ratio can be 1,000 times.

As shown (a) in FIG. 6, when control signal Sg input from the outside of lighting circuit 4 is an H level, both of first switch SW1 and second switch SW2 (see also FIG. 4) are in an on-state. When control signal Sg is an L level, both of first switch SW1 and second switch SW2 are in an off-state. During a period of time from 0 to t1, the constant current is supplied to resistor Rd, and the signal corresponding to the device characteristics information is input to the input of peak hold circuit Pc. Power source 41 performs, at time t1 and later, control corresponding to the device characteristics signal. Note that, as first switch SW1 and second switch SW2, there can be used relay switches, photo coupler switches, transistor switches, or other switches.

As shown (b) in FIG. 6, the current value Io flowing through LEDs 11 is represented by level (i) denoted by a solid line or level (ii) denoted by a dotted line, depending on the device characteristics signal of heat dissipation device 2. The device characteristics information (thermal resistance value) is electrically transferred to controller 42 of lighting device 1 so that lighting device 1 automatically adjusts the output of the current value Io flowing through LEDs 11, depending on the value of the device characteristics information. Thus, heat dissipation device 2 can be restrained from heating up to abnormal temperatures higher than an allowable value, for example. In addition, because the compatibility between heat dissipation device 2 and lighting device 1 is determined before turning on of LEDs 11, unnecessary stress is not put on lighting circuit 4 or the like; thus, appropriate current can flow through LEDs 11 since immediately after the turning on.

With lighting system 10, lighting device 1 having controller 42 can adjust an output of LEDs 11, based on the device characteristics information provided by device characteristics information providing unit 5 of heat dissipation device 2. In addition, because the compatibility between heat dissipation device 2 and lighting device 1 is automatically determined when the lighting device using the LED as the light source is attached to a heat dissipation device, it is possible to avoid incompatibility between heat dissipation device 2 and lighting device 1, whereby safety can be improved. In addition, device characteristics information providing unit 5 is resistor Rd, which is a simple configuration. For example, it is not necessary to provide a temperature sensor or the like to each of lighting device 1 and heat dissipation device 2. Further, there is no need for calculation means for calculating the thermal resistance value. Thus, the device can be downsized and reduced in cost.

The device characteristics information is the information about thermal resistance or temperature. Lighting system 10 automatically determines, with lighting circuit 4, the information related to the compatibility between lighting device 1 and heat dissipation device 2, based on the device characteristics information. Because the user does not have to make a judgment, lighting system 10 can be restrained from being used in a wrong combination.

In addition, because resistor Rd functioning as device characteristics information providing unit 5 is provided to socket 3 for detachably attaching lighting device 1 to heat dissipation device 2, device characteristics information providing unit 5 can be versatilely applied to lighting device 1 equipped with lighting circuit 4.

Figure 7:
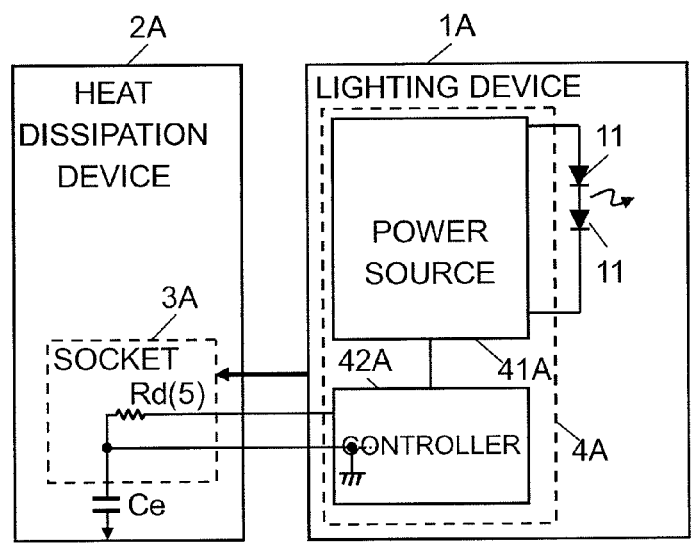
FIG. 7 is a block diagram of a lighting system according to a modified example of the first exemplary embodiment.

Here, lighting system 10A, which is a modified example of lighting system 10, will be described with reference to FIG. 7. In lighting system 10A, a potential on one end of resistor Rd is equal to a ground potential of controller 42. In other words, the one end of resistor Rd is connected to the ground. With this configuration, only the voltage on the other end of resistor Rd has to be detected to detect a voltage difference between the both ends of resistor Rd. Thus, a circuit configuration of controller 42 can be simple. In addition, in lighting system 10A, the one end of resistor Rd, which is at the ground potential, is further connected to heat dissipation device 2 through capacitor Ce. With this configuration, capacitor Ce makes resistor Rd less likely to be affected by external noises, and the device characteristics signal can be precisely transferred to controller 42.

Second Exemplary Embodiment

Figure 8:
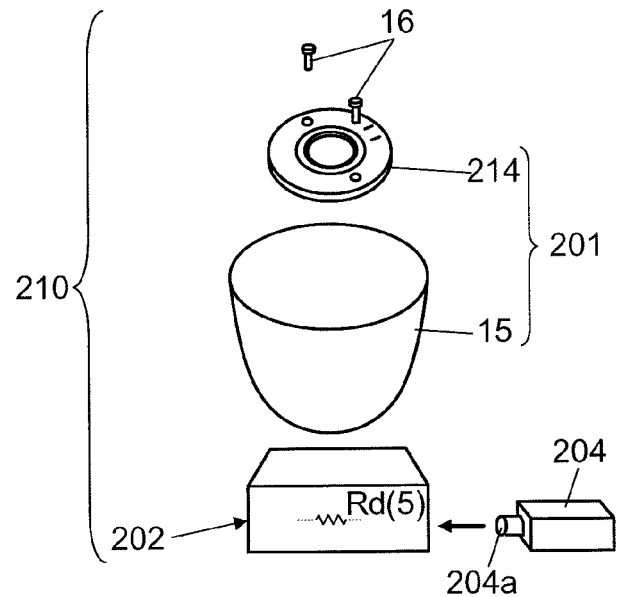
FIG. 8 is an exploded perspective view of a lighting system according to a second exemplary embodiment of the present disclosure.
Figure 9:
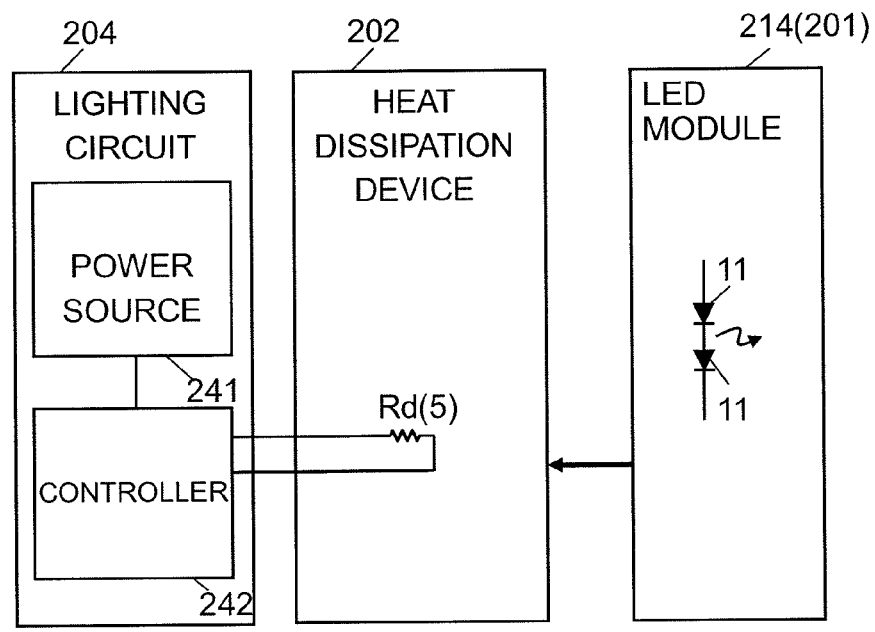
FIG. 9 is a block diagram of the lighting system shown in FIG. 8.

Next, lighting system 210 according to a second exemplary embodiment of the present disclosure will be described with reference to FIG. 8 and FIG. 9. FIG. 8 is an exploded perspective view of lighting system 210. FIG. 9 is a block diagram of lighting system 210.

As shown in FIG. 8, in lighting system 210, lighting device 201 includes LED module 214 and reflective plate 15 for distributing light emitted from LED module 214, and lighting circuit 204 is provided as a separate body from lighting device 201. In lighting system 10 of the first exemplary embodiment, lighting device 1 is attached to heat dissipation device 2 through socket 3. Lighting system 210 does not have a socket, and LED module 214 is fixed on heat dissipation device 202 with bolts 16. Note that it is desirable to provide a heat dissipation sheet (not shown) between LED module 214 and heat dissipation device 202. Lighting circuit 204 has connector 204a suitable for detachable connection to heat dissipation device 202. Lighting circuit 204 may be disposed apart from heat dissipation device 202, being wired to heat dissipation device 202.

Further, in lighting system 10, resistor Rd, which is device characteristics information providing unit 5, is provided on socket 3. As shown in FIG. 9, in lighting system 210, device characteristics information providing unit 5 (resistor Rd) is mounted directly on heat dissipation device 202, without using a socket. Note that resistor Rd may be connected from, for example, lighting circuit 204 through a connector.

Also in lighting system 210, in a similar way to that in lighting system 10, the device characteristics information (for example, thermal resistance value) is electrically transferred to controller 242 of lighting circuit 204, and controller 242 automatically adjusts the output of the current flowing through LEDs 11, depending on the value of the device characteristics information. In addition, heat dissipation device 202 and lighting device 201 (LED module 214) can be restrained from heating up to abnormal temperatures higher than an allowable value.

It is also possible to use a plurality of lighting circuits 204 having different rated currents. In that case, if it is determined, by comparing the rated current of lighting circuit 204 with the device characteristics signal provided by heat dissipation device 202, that heat can be sufficiently dissipated, the LED is driven with the rated current of each lighting circuit 204. If the temperature of heat dissipation device 202 will exceed the allowable value, controller 242 of lighting circuit 204 automatically detects the device characteristics information and controls power source 241 so that the temperature of heat dissipation device 202 is maintained to be the temperatures determined from the device characteristics signal.

Third Exemplary Embodiment

Figure 10:
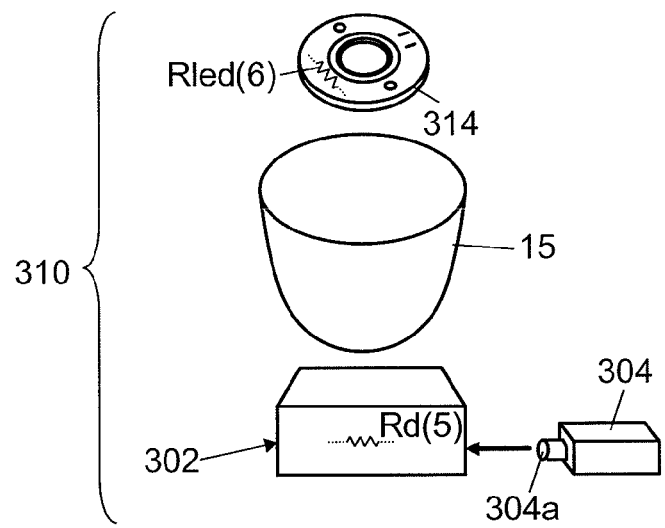
FIG. 10 is an exploded perspective view of a lighting system according to a third exemplary embodiment of the present disclosure.
Figure 11:
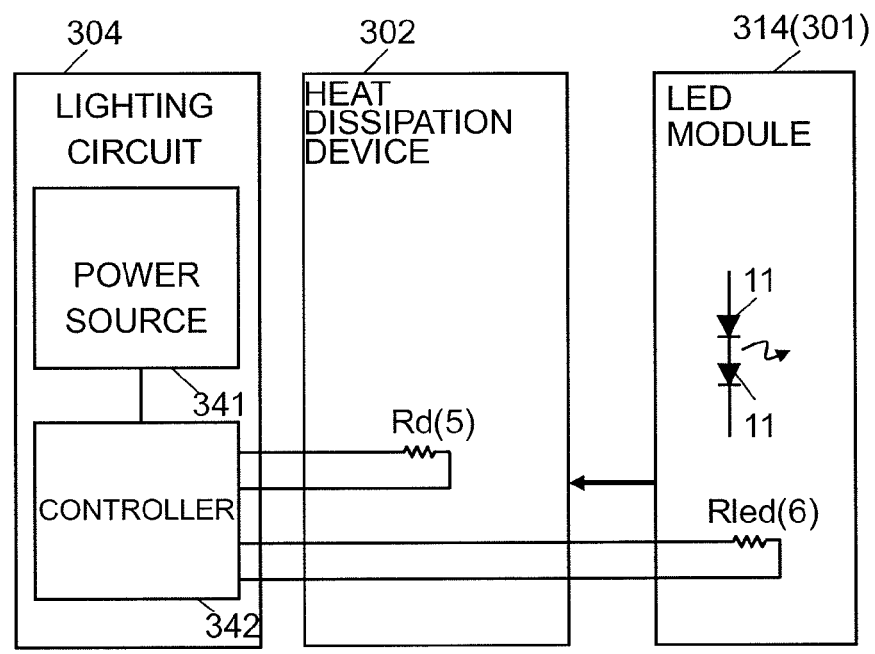
FIG. 11 is a block diagram of the lighting system shown in FIG. 10.
Figure 12:
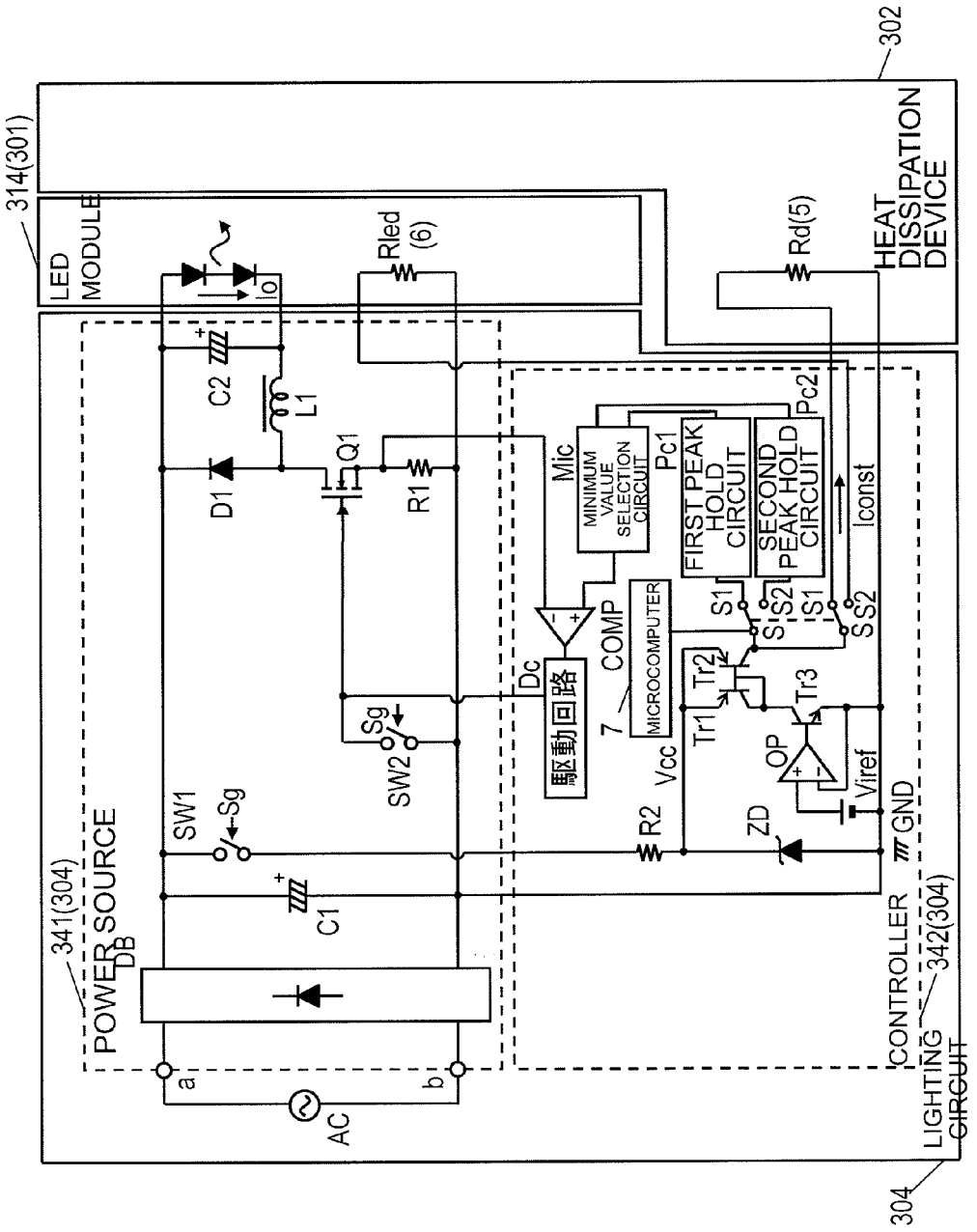
FIG. 12 is a circuit diagram of the lighting system shown in FIG. 10.

Next, lighting system 310 according to a third exemplary embodiment of the present disclosure will be described with reference to FIG. 10 to FIGS. 13(*a*) to 13(*c*). FIG. 10 is an exploded perspective view of lighting system 310. FIG. 11 is a block diagram of lighting system 310. FIG. 12 is a circuit diagram of lighting system 310. FIG. 13 is time chart showing relationships, in lighting system 310, (a) between a control signal Sg and time, (b) between states of switches 51 and S2 and time, and (c) between a current value Io and time.

In lighting system 310, light source characteristics providing unit 6 (resistor Rled) for providing information about characteristics of LEDs 11 is disposed in LED module 314, and both ends of resistor Rled are connected to controller 342. In the case of lighting system 310, a plurality of LED modules 314 having different rated currents are interchangeably used. Each LED module 314 is provided with resistor Rled corresponding to each rating of LEDs 11.

In this configuration, output signals (current values or voltage values) of resistor Rd of heat dissipation device 302 and resistor Rled of LED module 314 are separately input to controller 342 of lighting circuit 304, whereby controller 342 can perform various control methods. For example, the output voltage of resistor Rled is used as a reference value for current flowing through LEDs 11. To realize this arrangement, a constant current has only to be supplied to resistor Rled so that a voltage value on resistor Rled is used as the reference value. Next, a constant current is supplied also to resistor Rd of heat dissipation device 302 in a similar way, and the difference between the potentials on the both ends of resistor Rd is once stored and compared with the previously-mentioned difference between the potentials on the both ends of resistor Rled. Thus, if the potential difference of resistor Rled is smaller, LEDs 11 are kept to be driven with a rated current of LED module 314; however, if the potential difference of resistor Rd of heat dissipation device 302 is smaller, the value of the potential difference of resistor Rd is used as the value for the current for LED module 314. The figure shows one LED module 314 of some LED modules which can be connected to lighting circuit 304. LED module 314 is different from lighting system 10 shown in FIG. 4 mainly in that resistor Rled serving as characteristics information of LEDs 11 is added and in that a configuration of the circuit connected to the collector of transistor Tr2 is different. A collector of transistor Tr2 is connected to selection switch S having terminals S1 and terminals S2 and is connected to either terminals S1 or terminals S2. Terminals S1 are connected to first peak hold circuit Pc1 and resistor Rd, and terminals S2 are connected to second peak hold circuit Pc2 and resistor Rled. Outputs of first and second peak hold circuits Pc1 and Pc2 are input to minimum value selection circuit Mic. An output of minimum value selection circuit Mic is input to a positive terminal of comparator COMP. If a plurality of sets, each of which includes selection switch S, first peak hold circuit Pc1, and second peak hold circuit Pc2, are embedded in lighting circuit 304, it is possible to use lighting circuit 304 in combination with a plurality of LED modules 314.

The circuit configuration of lighting circuit 304 is useful when a plurality of LED modules 314 having different outputs are interchangeably used on heat dissipation device 302. The resistance value of resistor Rled may be a resistance value proportional to the value of the current designed to flow through LEDs 11 or a resistance value corresponding to a maximum allowable temperature of LED module 314, or a thermal resistance value as described above, for example.

Next, an operation of the circuit shown in FIG. 12 will be described. As described above, a constant current Iconst flows from the collector of transistor Tr2. At this time, terminals S1 of selection switches S are first selected, and a voltage of the value of (Iconst)×(resistance Rd) is thus applied to an input terminal of first peak hold circuit Pc1. Next, terminals S2 of selection switches S are selected, and the constant current Iconst thus flows through resistor Rled. With this operation, a voltage of the value of Iconst×Rled is applied to an output terminal of second peak hold circuit Pc2.

Then, the value of the smaller one of the voltages of first peak hold circuit Pc1 and second peak hold circuit Pc2 is selected by minimum value selection circuit Mic, and the value of the smaller one is input to a positive input terminal of comparator COMP as an output of minimum value selection circuit Mic. Therefore, for example, even when the current to flow through LEDs 11 is set to Io=500 mA by resistor Rled, if the current is not thermally allowed to heat dissipation device 302, the current is limited to Io=400 mA by resistor Rd, or second switch SW2 is turned on in order to turn off LEDs 11 by reason of an inappropriate combination with heat dissipation device 302. In addition, it is also possible to blink LEDs 11 to let the user know.

Peak hold circuits Pc1 and Pc2 are not especially limited thereto, and any circuit can be used if the circuit can temporarily hold the input signal. In another configuration, the voltage generated on the collector of transistor Tr2 may be A/D converted and then stored in a data area of microcomputer 7. If a microcomputer is used, functions of the other parts of the controller can also be programmed in the microcomputer; thus, the device can be downsized and circuit constants can be changed by modifying the control.

Further, it is preferable that controller 342 has a storage section (memory) for storing a result of determination of compatibility between heat dissipation device 302 and LED module 314 (lighting device 301). The memory may be one embedded in microcomputer 7. With this arrangement, the characteristics signals can be stored, and thus it does not take time to determine the compatibility when LED module 314 is attached to heat dissipation device 302 at the second time and after.

FIGS. 13(a) to 13(c) are control timing charts of the circuit shown in FIG. 12 after the power is on. As shown (a) in FIG. 13, when the control signal Sg is an H level, first switch SW1 and second switch SW2 are both in an on-state, and when the control signal Sg is an L level, first switch SW1 and second switch SW2 are both in an off-state.

The signal Sb shown (b) in FIG. 13 represents a state of selection switches S to which the collector of transistor Tr2 is connected. When the solid line S1 in the figure is an H level, the collector of transistor Tr2 is connected to terminals S1 of selection switches S, and when the dotted line S2 is an H level, the collector of transistor Tr2 is connected to terminals S2 of selection switches S. In the period from time 0 to t1, when the collector of transistor Tr2 is connected to terminals S1 by selection switch S, the constant current is supplied to resistor Rd, and a signal corresponding to the device characteristics information is input to the input terminal of first peak hold circuit Pc1. On the other hand, when the collector of transistor Tr2 is connected to terminals S2 by selection switch S, the constant current is supplied to resistor Rled, and a signal corresponding to the characteristics information of LEDs 11 is input to the input terminal of second peak hold circuit Pc2. Then, the value of the smaller one of the two input signals becomes a reference value of an output of minimum value selection circuit Mic, in other words, the current flowing through LEDs 11.

Then, as shown (c) in FIG. 13, at time t1 and after, controller 342 performs a control operation corresponding to the characteristics signals. The current value Io becomes the level denoted by (i) and represented by a solid line, depending on the device characteristics signal of a heat dissipation device 2 side, or becomes the level denoted by (ii) and represented by a dotted line, depending on the characteristics signal on the LED module 314 side, for example. As described above, each piece of characteristics information is electrically transferred to controller 342 of lighting device 301, and lighting device 301 automatically adjusts the output of the current flowing through LEDs 11, depending on the values of the transferred information. Thus, heat dissipation device 302 or LED module 314 can be restrained from heating up to abnormal temperatures higher than an allowable value, for example.

In lighting system 310, in the case that a plurality of LED modules 314 having different rated currents are interchangeably used, if it is determined, by comparing the rated current of LED modules 314 with the device characteristics signal, that a sufficient heat dissipation property will be secured, each LED module 314 is driven with its rated current. However, if the temperature of heat dissipation device 302 will exceed the allowable value, controller 342 of lighting circuit 304 automatically detects the device characteristics information and controls the lighting of LEDs 11 so that the current is maintained to be the current value limited by the device characteristics signal. Thus, the compatibility between heat dissipation device 302 and lighting device 301 (LED module 314) is taken into consideration, whereby incompatibility of the combination of heat dissipation device 302 and lighting device 301 (LED module 314) is avoided. In other words, safety is improved.

Note that the present disclosure is not limited to the above-described exemplary embodiments and can be modified in various ways. For example, each of the above-described exemplary embodiments shows the example in which one resistor Rd is used as the device characteristics information; however, a plurality of resistors Rd can be used. In that case, for example, if one resistor represents a thermal resistance value at a base temperature and the other resistor represents a gradient with respect to temperature change, controllers 42, 242, and 342 can control the lighting of LEDs 11 with a higher precision.

What is claimed is:

1. A lighting system comprising:
a lighting device including an LED as a light source;
a lighting circuit including:
a power source configured to supply electric power to the light source; and
a control circuit configured to control current which is output from the power source to the light source; and
a heat dissipation device configured to dissipate heat generated by the lighting device,
wherein the heat dissipation device includes a resistor configured to provide device characteristics information of the heat dissipation device to the control circuit,
the control circuit determines compatibility between the heat dissipation device and the lighting device, based on the device characteristics information, and controls lighting of the light source,
the heat dissipation device includes a socket with which the lighting device is attached to the heat dissipation device, and
the resistor is provided to the socket.

2. A lighting system comprising:
a lighting device including an LED as a light source;
a lighting circuit including:
a power source configured to supply electric power to the light source; and
a control circuit configured to control current which is output from the power source to the light source; and
a heat dissipation device configured to dissipate heat generated by the lighting device,
wherein the heat dissipation device includes a resistor configured to provide device characteristics information of the heat dissipation device to the control circuit,
the control circuit determines compatibility between the heat dissipation device and the lighting device, based on the device characteristics information, and controls lighting of the light source, and
the lighting circuit includes a connector suitable for detachable connection to the heat dissipation device.

3. A lighting system comprising:
a lighting device including an LED as a light source;
a lighting circuit including:
a power source configured to supply electric power to the light source; and
a control circuit configured to control current which is output from the power source to the light source; and
a heat dissipation device configured to dissipate heat generated by the lighting device,
wherein the heat dissipation device includes a first resistor configured to provide device characteristics information of the heat dissipation device to the control circuit,
the control circuit determines compatibility between the heat dissipation device and the lighting device, based on the device characteristics information, and controls lighting of the light source, and
the lighting device includes a second resistor configured to provide light source characteristics information of the lighting device to the control circuit.

4. A lighting system comprising:
a lighting device including an LED as a light source;
a lighting circuit including:
a power source configured to supply electric power to the light source; and
a control circuit configured to control current which is output from the power source to the light source; and
a heat dissipation device configured to dissipate heat generated by the lighting device,
wherein the heat dissipation device includes a resistor configured to provide device characteristics information of the heat dissipation device to the control circuit,
the control circuit determines compatibility between the heat dissipation device and the lighting device, based on the device characteristics information, and controls lighting of the light source, and
a relationship between a resistance value of the resistor and a value of thermal resistance or temperature of the device characteristics information is a proportional function or an upwardly-convex increasing function.

5. A lighting system comprising:
a lighting device including an LED as a light source;
a lighting circuit including:
a power source configured to supply electric power to the light source; and
a control circuit configured to control current which is output from the power source to the light source;
a heat dissipation device configured to dissipate heat generated by the lighting device; and
a capacitor,
wherein the heat dissipation device includes a resistor configured to provide device characteristics information of the heat dissipation device to the control circuit,
the control circuit determines compatibility between the heat dissipation device and the lighting device, based on the device characteristics information, and controls lighting of the light source,
the resistor includes a resistor circuit having one end connected to a ground, and
the capacitor is disposed between the one end of the resistor circuit and the ground.

6. The lighting system of claim 1, wherein the device characteristics information includes information about thermal resistance or temperature of the heat dissipation device.

7. The lighting system of claim 1, wherein the control circuit includes a memory configured to store a result of the determination of the compatibility between the heat dissipation device and the lighting device.

8. The lighting system of claim 2, wherein the device characteristics information includes information about thermal resistance or temperature of the heat dissipation device.

9. The lighting system of claim 2, wherein the control circuit includes a memory configured to store a result of the determination of the compatibility between the heat dissipation device and the lighting device.

10. The lighting system of claim 3, wherein the device characteristics information includes information about thermal resistance or temperature of the heat dissipation device.

11. The lighting system of claim 3, wherein the control circuit includes a memory configured to store a result of the determination of the compatibility between the heat dissipation device and the lighting device.

12. The lighting system of claim 4, wherein the device characteristics information includes information about thermal resistance or temperature of the heat dissipation device.

13. The lighting system of claim 4, wherein the control circuit includes a memory configured to store a result of the determination of the compatibility between the heat dissipation device and the lighting device.

14. The lighting system of claim 5, wherein the device characteristics information includes information about thermal resistance or temperature of the heat dissipation device.

15. The lighting system of claim 5, wherein the control circuit includes a memory configured to store a result of the determination of the compatibility between the heat dissipation device and the lighting device.

* * * * *